United States Patent [19]

Fukuhara

[11] 4,122,468
[45] Oct. 24, 1978

[54] MIRROR DEVICE IN A SINGLE LENS REFLEX CAMERA OR THE TTL METERING TYPE

[75] Inventor: Toru Fukuhara, Fujisawa, Japan

[73] Assignee: Nippon Kogaku K.K., Tokyo, Japan

[21] Appl. No.: 776,363

[22] Filed: Mar. 10, 1977

[30] Foreign Application Priority Data

Mar. 16, 1976 [JP] Japan .................................. 51-27740
Mar. 16, 1976 [JP] Japan .................................. 51-27741

[51] Int. Cl.² ............................................. G03B 7/00
[52] U.S. Cl. ...................................... 354/59; 354/152
[58] Field of Search ...................... 354/22, 23, 53–56, 354/59, 155, 201, 152; 356/225, 233

[56] References Cited

U.S. PATENT DOCUMENTS

| | | | |
|---|---|---|---|
| 3,385,190 | 5/1968 | Sho et al. | 354/23 |
| 3,446,126 | 5/1969 | Leitz et al. | 354/59 |
| 3,540,364 | 11/1970 | Ono | 354/55 |
| 3,643,575 | 2/1972 | Ono | 354/23 |
| 3,779,146 | 12/1973 | Trankner | 354/23 |

*Primary Examiner*—John Gonzales
*Attorney, Agent, or Firm*—Fitzpatrick, Cella, Harper & Scinto

[57] ABSTRACT

In a single lens reflex camera of the TTL metering type comprising a mirror device having a central translucent area containing the optic axis of the picture-taking lens of the camera and a reflecting area surrounding the central translucent area, the mirror device being disposed in intersecting relationship with the optic axis, and a light receiving element disposed behind the mirror device to measure the quantity of light passed through the central area, the central area is so formed that the quantity of light passed through the central area to the light receiving element is varied substantially in proportion to the area of the exit pupil of the picture-taking lens has been stopped down.

5 Claims, 12 Drawing Figures

MIRROR DEVICE IN A SINGLE LENS REFLEX CAMERA OR THE TTL METERING TYPE

BACKGROUND OF THE INVENTION

1. Field of the Invention

This invention relates to a mirror device in a single lens reflex camera of the TTL metering type which permits interchange of the lens, and more particularly to a mirror device for use with such reflex camera in which the area of a portion of the mirror is translucent and a light receiving element is disposed behind the translucent area of the mirror so that the light passed from the picture-taking lens through the translucent area of the mirror is received by the light receiving element.

2. Description of the Prior Art

The most popular cameras of the described type are such that during metering, the light receiving element lies in the picture-taking light path and the light from the picture-taking lens is reflected toward the viewfinder by the mirror while part of the light passes through the translucent area of the mirror to the light receiving element, and that during photography, the translucent area of the mirror now moved up is covered by another member while the light receiving element is retracted from the picture-taking light path.

The cameras of such metering type usually have the following two disadvantages. As a first disadvantage, it may be mentioned that even with the same lens, if the aperture value thereof is varied, the output of the exposure meter does not exhibit a variation corresponding to the nominal aperture value thus changed. The reason is that the outline of the translucent area of the mirror acts as a kind of aperture for limiting the light entering the light receiving element and therefore, the intensity of illumination on the light receiving surface of the light receiving element is not always proportional to the area of the exit pupil of the lens. More specifically, in FIG. 1 of the accompanying drawings, the light ray shown as passing from the exit pupil 1a of a lens 1 (having a nominal aperture value of f/1.4) to the center 2' of the picture plane of a film 2 passes through a rectangular translucent area 4 provided in a mirror 3 and through the opening 5a of a mirror supporting member 5 and enters a light receiving element 6.

The mirror 3, only in the translucent area 4 thereof, causes the light from the lens 1 to pass toward the light receiving element 6 and the other area of the mirror reflects the light toward the unshown viewfinder of the camera. Accordingly, the light rays from exit pupils 1a and 1b are considerably reflected toward the viewfinder, so that the light rays passed through the translucent area 4 are considerably decreased. In contrast, the light rays from exit pupils 1c and 1d all enter the translucent area 4. Therefore, as regards the exit pupils 1a and 1b, the quantity of light from these exit pupils received by the light receiving element 6 is decreased as compared with the quantity of light as determined by their nominal aperture values f/1.4 and f/2. Especially, the decrease in quantity of light is greatest in the case of the light ray from the exit pupil 1a. In contrast, as regards the exit pupils 1c and 1d, the quantity of light from these exit pupils received by the light receiving element is just in accord with the quantity of light as determined by their nominal aperture values f/2.8 and f/4. Thus, the relation between the nominal aperture values of the lens and the output of the light receiving element, namely, the output of the exposure meter, depicts a curve as indicated by $a$ in FIG. 2 of the drawings, which means that this relation is disproportionate. For example, if the aperture value is varied over one or two nominal steps from a nominal aperture value f/2.8 to f/2 or f/1.4, the output of the exposure meter is not equally varied, say, not to two or four times.

If photography is carried out in accordance with such an indication by the exposure meter, the resultant photographs will be irregular in exposure because, in any of the open metering and the stopped-down metering conditions, the indication by the exposure meter will be varied by the aperture value used.

A second disadvantage occurs when the light receiving element is not disposed at the point of intersection of the film surface with the optic axis of the picture-taking lens or at a location conjugate with such point of intersection. That is, even with interchangeable lenses having the same aperture value, if the focal length thereof is varied, or in other words, if the distance from the exit pupil of the picture-taking lens to the film surface differs between the lenses, there occurs a difference in the output of the exposure meter. The reason is that if the position of the exit pupil is varied, the solid angle at which the light receiving element is subtended by the exit pupil is varied in spite of the aperture value remaining unchanged. More specifically, in FIGS. 4(a) and 4(b), reference character 8 designates the exit pupil of a long-focal-length lens, and 8a and 8b designate the upper and the lower ends of the lens, respectively. Designated by 9 is the exit pupil of a short-focal-length lens, and 9a and 9b designate the upper and the lower ends of such lens, respectively. The exit pupils 8 and 9 have the same aperture value, as can be seen from the fact that their upper ends 8a, 9a and the center 2' of the picture plane of the film 2 lie on the same straight line 10 and their lower ends 8b, 9b and the center 2' of the picture plane of the film 2 lie on the same straight line 11.

In FIG. 4(a), the exit pupils 8 and 9 have the same solid angle with respect to the center 2' of the picture plane, but the exit pupil 9 has a greater solid angle than the exit pupil 8 with respect to the center point 6a of the light receiving element 6 which lies short of the film surface. Therefore, the light from the exit pupil 9 contributes more to an increased intensity of illumination on the center point 6a of the light receiving element 6 than the light from the exit pupil 8. This also holds true of the upper and lower ends 6b and 6c of the light receiving element in FIG. 4(b). Accordingly, the quantity of light received by the entire light receiving element 6 differs between the short-focal-length lens and the long-focal-length lens and thus, even if the lenses have the same aperture value, the short-focal-length lens results in a greater output of the exposure meter. This is particularly important to open metering. In other words, the output of the exposure meter presents irregularity with respect to lenses of various focal lengths and various open F-values, as shown at $a$ in FIG. 5, and such irregularity results in an error of exposure.

Therefore, if open metering is effected even with interchangeable lenses of the same open F-values, the exposure meter will produce different outputs for the short-focal-length lens and the long-focal-length lens and, if photography is carried out in accordance with the indications by the exposure meter, the resultant photographs will be improper in exposure.

In an attempt to eliminate these disadvantages, there have heretofore been proposed various methods, which may generally be classified into the following two types. One of them is a method of controlling the quantity of light entering the light receiving element and the other is a method of correcting the excessively great or small output of the light receiving element by mechanical or electrical means (often by both means). To carry out the former method, there is an apparatus which employs a cylindrical or a spiral shield disposed immediately in front of the light receiving element, but such a construction leads to an increased number of parts. This also means an increased weight of movable parts in the design wherein the light receiving element is retracted out of the picture-taking light path during photography, and such increased weight forms a burden to the mechanism. In the latter method, a signal pin for transmitting aperture values and focal lengths is provided on the lens side and the information from such signal pin is received by the camera body side to correct the output of the exposure meter, and this leads to an increased number of parts and complication of the entire construction.

SUMMARY OF THE INVENTION

It is an object of the present invention to provide a single lens reflex camera having an exposure meter in which the quantity of light entering a light receiving element disposed behind a mirror varies in proportion to the area of the exit pupil of the picture-taking lens of the camera.

It is a second object of the present invention to provide a single lens reflex camera having an exposure meter in which, if the aperture value is constant, a constant quantity of light may enter the light receiving element irrespective of the focal length of the picture-taking lens to cause the exposure meter to produce a constant output.

To achieve the above-described objects, the present invention limits the light passed through the translucent area of the mirror, especially the light passed through the area of the mirror neighboring the point of intersection of the mirror with the optic axis of the picture-taking lens. Specifically, an area having a lower transmission factor than that of the translucent area is formed in the neighborhood of the point of intersection of the mirror with the optic axis of the lens, within the translucent area located substantially centrally of the reflecting surface of the mirror device. Combination of a plurality of areas having such different transmission factors may be realized either by evaporating silver of like metal onto the mirror during its manufacture or by the entire mirror device including the member for supporting the mirror.

The invention will become more fully apparent from the following detailed description thereof taken in conjunction with the accompanying drawings.

DESCRIPTION OF THE PREFERRED EMBODIMENTS

Figure 2:
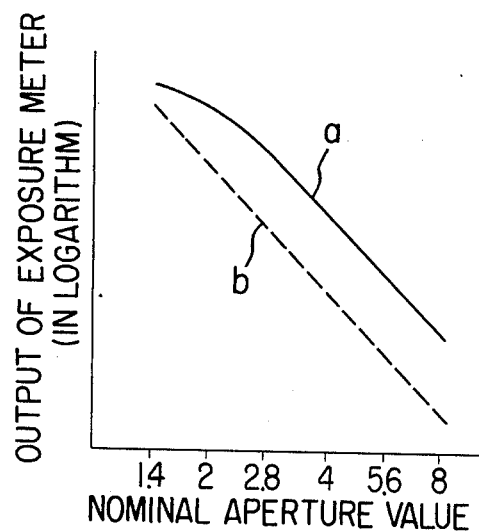
FIG. 2 is a graph illustrating the relation between the nominal aperture values of a lens and the output of an exposure meter.
Figure 3:
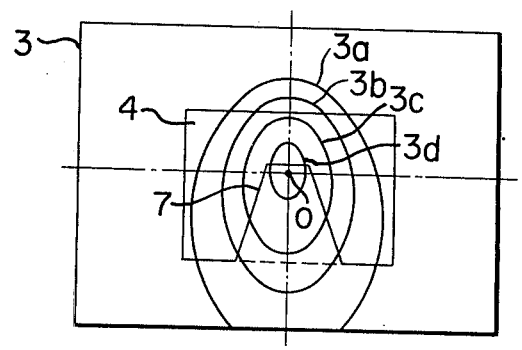
FIG. 3 illustrates the manner in which the light rays received by the light receiving element is thrown upon the mirror device according to an embodiment of the present invention.

The invention will hereinafter be described with respect to various embodiments thereof. Referring to FIG. 3 which shows a first embodiment of the present invention, a central reflecting area 7 is provided centrally of a translucent area 4 and about the optic axis O of the lens. The central reflecting area 7 is formed as a reflection area and the shape thereof is selected such that the solid angles at which the center 2' of the picture plane of the film is subtended by exit pupils 1a, 1b, 1c and 1d, respectively, through the translucent area 4 are substantially logarithmically proportional to the respective nominal aperture values of these exit pupils. Thus, to the light receiving element 6, the central reflecting area 7 acts as a shield for shielding the incident light from the exit pupils 1c and 1d at a greater rate than the incident light from the exit pupils 1a and 1b. Therefore, the output of the light receiving element 6, namely, the output of the exposure meter, is improved so as to be substantially proportional to the nominal aperture values, as shown by b in FIG. 2. In this case, however, it is unavoidable for the output level of the exposure meter to be somewhat reduced since the light is, as it were, discarded. This is because the central reflecting area 7 acts as a shield. Accordingly, as the aperture value is varied by one and two nominal steps, respectively, from the nominal aperture value f/2.8, the output of the exposure meter is substantially equally varied, say, to two and four times, respectively.

Figure 4A:
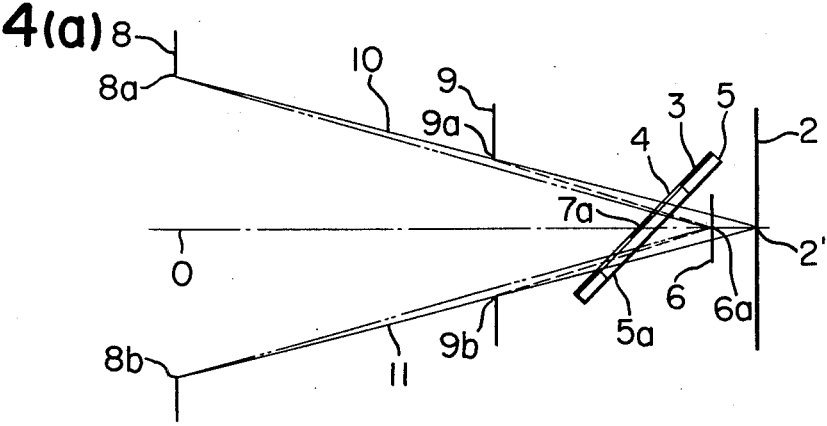
FIGS. 4(a) and 4(b) illustrate the relations between the exit pupils of interchangeable lenses having the same aperture values but different focal lengths and the light rays received by the light receiving element.
Figure 4B:
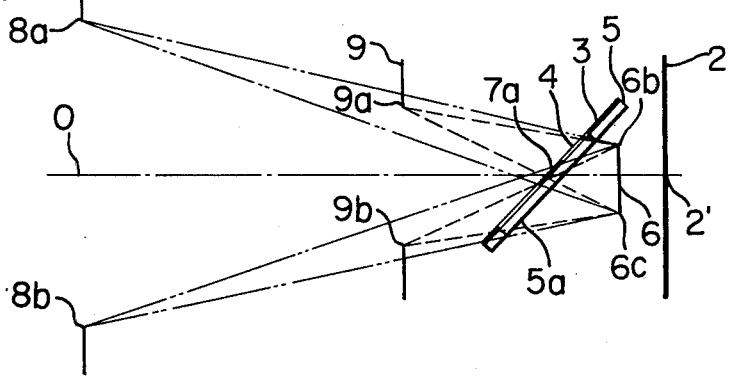
Figure 5:
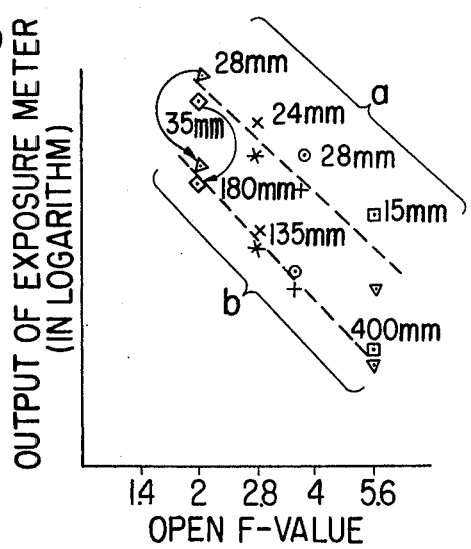
FIG. 5 is a graph illustrating several open F-values to represent the relations between the open F-values and the output of the exposure meter with respect to various interchangeable lenses having the same open F-values but different focal lengths.

Reference will now be had to FIGS. 4(a) and 4(b) to explain the function performed by the central reflecting area. Where the central reflecting area 7a is formed about the optic axis O of the lens within the translucent area 4 of the mirror 3, the quantity of light reaching the center point 6a of the light receiving element 6 is greater from the exit pupil 9 than from the exit pupil 8, as already described. However, as regards the solid angle at which the upper end 6b of the light receiving element 6 is subtended, the quantity of light incident from the exit pupil 8 is greater than that from the exit pupil 9, because the light incident from the neighborhood of the lower end 9b of the exit pupil 9 is shielded by the central reflecting area 6a. The solid angle at which the lower end 6c of the light receiving element 6 is subtended is substantially equal with respect to the exit pupils 8 and 9, because the light incident from the neighborhood of the upper end 9a of the exit pupil 9 is shielded by the reflecting area 6a and because the light incident from the neighborhood of the lower points 8b, 9b of the exit pupils 8, 9 originally does not pass through the translucent area 4. Thus, the sum of the solid angles described above, if obtained for the entire area of the light receiving surface of the light receiving element 6, will be substantially equal with respect to the exit pupils 8 and 9. Therefore, the output of the light receiving element 6 becomes substantially equal with respect to the exit pupils 8 and 9, and thus, with lenses of the same open F-values, the outputs of the exposure meter are substantially equal independently of the focal lengths of the lenses, as indicated at b in FIG. 5. If this is viewed with respect to each of the F-values, it will be seen that the output of the exposure meter is varied substantially in logarithmical proportion to the nominal steps of the F-values. In this instance, however, the output level is somewhat reduced from a to b in FIG. 5. This is attributable to the same reason as that described in connection with FIG. 2.

In FIGS. 4(a) and 4(b), the exit pupils 8 and 9 have been described as those of two different picture-taking lenses, and the same analysis as that shown above may hold true also of a picture-taking lens such as the so-called zoom lens having a variable focal length.

The central reflecting area has hitherto been considered from two points of view. In the foregoing description, and in FIGS. 4(a) and 4(b), the central reflecting areas 7 and 7a differ in shape. This is only for the purpose of illustration and actually, the central reflecting area is formed integrally with the mirror 3.

The analysis for determining the shape and transmission factor of the central reflecting area 7 will now be made by reference to FIG. 6 in which the translucent area of the mirror is projected upon the exit pupil plane of the lens with respect to the center point of the light receiving element.

Figure 6:
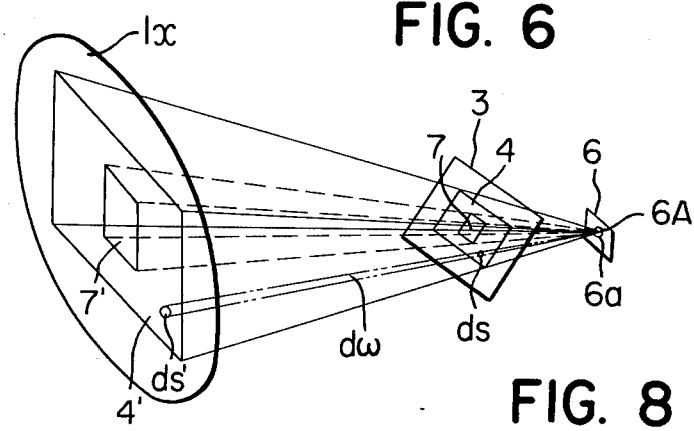
FIG. 6 is a view illustrating the translucent area of the mirror as projected upon the exit pupil of a lens with respect to the center point of the light receiving element.

Designated by 4' and 7' in FIG. 6 are the figures of the translucent area 4 and central reflecting area 7 of the mirror 3 as they are reversely projected upon the exit pupil 1x of the lens with respect to the center point 6a of the light receiving element 6. Designated by $ds'$ is the figure of a minute area $ds$ on the translucent area 4 as it is projected upon the exit pupil 1x with a minute solid angle $d\omega$ at which the minute area $ds$ subtends the center 6a of the light receiving surface. The transmission factor of the translucent area 4 within such minute area $ds$ is $\tau$. It is to be understood that the transmission factor $\tau$, in the entire translucent area 4, is variable to several values.

Generally, the intensity of illumination produced at a predetermined point by a certain planar light source is determined by the solid angle at which the predetermined point is subtended by the planar light source. In FIG. 6, the intensity of illumination produced at the center point 6a may be considered to be the product of the solid angle and the transmission factor, because the transmission factor $\tau$ of the translucent area 4 intervenes between the planar light source and the center point. That is, $$\int_S \tau \cdot d\omega \tag{1}$$

(S: the dimensions of the translucent area)

This is the element for determining the intensity of illumination at the center point 6a.

The output of the light receiving element 6 may be considered to be proportional to the quantities of light at the above-described various points on the light receiving surface of the light receiving element, integrated over the entire light receiving surface. That is, the output is proportional to the quantity of light given by $$\int_A \int_S \tau \cdot d\omega \cdot dA \tag{2}$$

(A: the light receiving area of the light receiving element)

Figure 1:
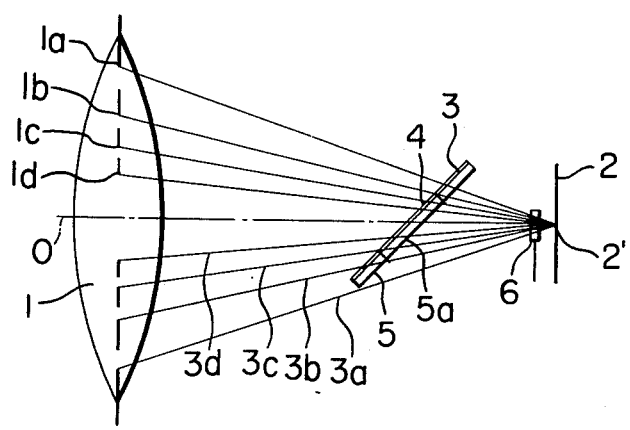
FIG. 1 illustrates the positional relationship between the light path from a group of exit pupils of a picture-taking lens lying at the same distance from the surface of the film to a light receiving element and a mirror disposed in the light path.

Thus, the shape and transmission factor $\tau$ of the central reflecting area 7 may be selected such that, with respect to the exit pupils 1a, 1b, 1c and 1d of FIG. 1, the foregoing integrated value 2 is logarithmically proportional to the various nominal aperture values, and may be selected such that, with respect to the exit pupils 8 and 9 of the lenses of FIGS. 4(a) and 4(b) having the same aperture value, the foregoing integrated value is one and the same.

In some cases, the area 4' is not contained in the exit pupil 1x depending on the lens or depending on the manner in which the point on the light receiving element 6 is chosen or in other cases, the projected light is intercepted by an unshown other part (such as mirror box or the like). In these cases, the foregoing formulation may intactly hold true if it is assumed that $d\omega = 0$.

As will be apparent from what has been described above, if the central reflecting area is formed in the neighborhood of the point of intersection between the mirror 3 and the optic axis of the lens, the output of the exposure meter is substantially logarithmicaly proportional to each aperture value of the lens, regardless of opening metering or stopped-down metering. Also, the output of the exposure meter is substantially accurately determined even where interchangeable lenses having various open F-values are employed. The light receiving element has heretofore been described as lying on the optic axis of the lens and forwardly of the film surface. However, it will of course be possible for the central reflecting area to bring about the above-described effect in any other case where the light receiving element does not lie at the center of the picture plane of the film or at a point conjugate with such center. The shape of the central reflecting area may be various depending on the position and size of the light receiving surface or the lens employed. Further, the transmission factor of the central reflecting area need not be zero. Also, the shape of the central reflecting area and of the translucent area may be determined by the shape of the mask for the opening 5a of the mirror support member 5.

Figure 7:
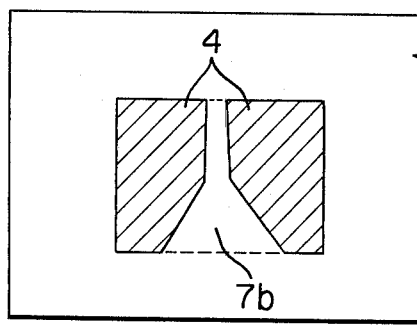
FIGS. 7 to 9, 10(a), 10(b) show further embodiments of the present invention.
Figure 8:
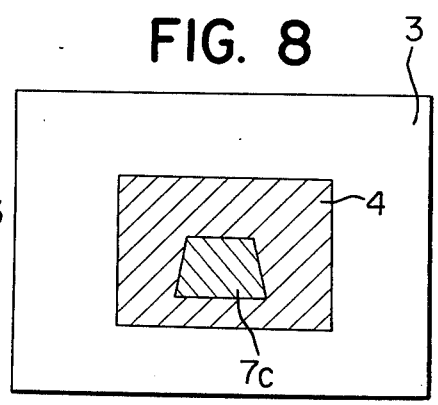
Figure 9:
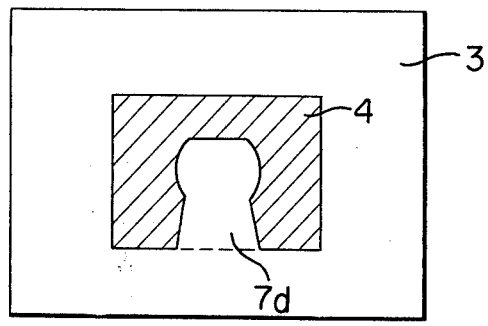

Further embodiments of the present invention will now be disclosed. FIG. 7 shows an embodiment in which the translucent area 4 is bisected by the central reflecting area 7b. FIG. 8 shows an embodiment in which the central reflecting area 7c is isolated and formed with a lower transmission factor (accordingly, a higher reflection factor) than that of the translucent area 4. FIG. 9 shows an embodiment in which the central reflecting area 7d is square in the upper and circular in the lower.

Figure 10A:
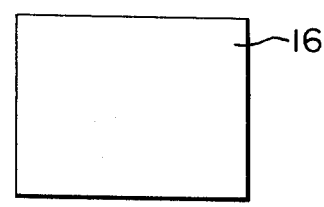
Figure 10B:
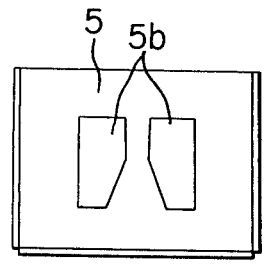

In any of these embodiments, the translucent area and central reflecting area of the mirror device are formed by evaporation. However, it is also within the scope of the present invention to form the central reflecting area by combination of two portions having different transmission factors. More specifically, the central reflecting area may be formed such that the average transmission factor of one area containing that portion of the translucent area neighboring the optic axis is lower than the average transmission factor of the area surrounding said one area. In FIGS. 10(a) and 10(b), there is shown an embodiment in which the requirement of transmission factor is satisfied by the mirror support member 5. The mirror 16 is a half-mirror having a uniform transmission factor over the entire surface thereof. The mirror support member 5 is formed with an opening 5b. Combination of the mirror 16 and the mirror support member 5 can achieve an effect similar to that attained by the above-mentioned evaporation.

Thus, according to the present invention, regardless of open metering or stopped-down metering, the output of the exposure meter can be determined substantially accurately with respect to various aperture values and moreover, logarithmicaly proportional to the nominal aperture values. Therefore, if photography is carried out in accordance with the indications by the exposure meter, the resultant photographs will have less error in exposure. Further, the present invention eliminates the signal pins on interchangeable lenses and the corresponding correction mechanism on the camera body side, thus simplifying the construction of the entire camera. Also, according to the present invention, the reflection factor in the neighborhood of the center of the mirror device is increased to thereby make the viewfinder brighter and focusing easier to achieve.

What is claimed is:

1. In a single lens reflex camera of the TTL metering type comprising a mirror device having a semi-transparent area through which effective light flux coming from the exit pupil of the picture-taking lens is partly passed and a reflecting area surrounding said semi-transparent area, said mirror device being disposed in intersecting relationship with the optial axis of said picture-taking lens; and a light receiving element disposed behind the mirror device to measure the quantity of light passed through said semi-transparent area, wherein the size of said semi-transparent area is smaller than the maximum of an intersecting area of the light flux from said exit pupil to said light receiving element with said mirror device, the improvement comprising a light intercepting area formed in the neighborhood of, or on and in the neighborhood of the optical axis of said picture-taking lens and surrounded by said semi-transparent area, the average transmission factor of said light intercepting area being lower than that of said semi-transparent area, and said light intercepting area being formed to be always within said intersecting area so that the ratio of the quantity of said transmitting light to the light quantity of said effective light flux may be constant notwithstanding variations in size of said intersecting area.

2. A single lens reflex camera according to claim 1, wherein said mirror device includes a semi-transparent mirror having a plurality of portions where the transmission factors are different from each other, and a holding member for holding said semi-transparent mirror, the holding member being formed with an opening located so as to correspond to at least said semi-transparent area.

3. A single lens reflex camera according to claim 2, wherein said light intercepting area has substantially the same reflection factor as that of said reflecting area, the light intercepting area being formed so that the sum of both areas of the light intercepting area and the reflecting area included in each intersecting area is constant in ratio with respect to said each intersecting area.

4. A single lens reflex camera, according to claim 3, wherein said light intercepting area includes a portion which is continuous to said reflecting area and extends to and into the neighborhood of the optical axis.

5. A single lens reflex camera, according to claim 1, wherein said mirror device includes a semi-transparent mirror having an even transmission factor and a holding member for holding the semi-transparent mirror, the holding member being formed with an opening for determining said semi-transparent area and a light intercepting portion projected into the last mentioned opening to determine said light intercepting area.

* * * * *

UNITED STATES PATENT AND TRADEMARK OFFICE
CERTIFICATE OF CORRECTION

PATENT NO. : 4,122,468
DATED : October 24, 1978
INVENTOR(S) : TORU FUKUHARA

It is certified that error appears in the above-identified patent and that said Letters Patent are hereby corrected as shown below:

On Title Page "[54]", change "MIRROR DEVICE IN A SINGLE LENS REFLEX CAMERA OR THE TTL METERING TYPE" to --MIRROR DEVICE IN A SINGLE LENS REFLEX CAMERA OF THE TTL METERING TYPE--.

Column 1, line 4, change "MIRROR DEVICE IN A SINGLE LENS REFLEX CAMERA OR THE TTL METERING TYPE" to --MIRROR DEVICE IN A SINGLE LENS REFLEX CAMERA OF THE TTL METERING TYPE--.

Column 6, line 12, change "2" to --(2)--.

Signed and Sealed this

Seventeenth Day of July 1979

[SEAL]

Attest:

LUTRELLE F. PARKER
*Attesting Officer*       *Acting Commissioner of Patents and Trademarks*